United States Patent [19]

Garrison

[11] 4,228,220
[45] Oct. 14, 1980

[54] SELECTIVE ABSORBER ON GLASS AND METHOD FOR ITS PRODUCTION

[76] Inventor: John D. Garrison, 5607 Yerba Anita Dr., San Diego, Calif. 92115

[21] Appl. No.: 920,073

[22] Filed: Jun. 28, 1978

[51] Int. Cl.$^3$ .......................... C25D 5/54; C25D 5/10
[52] U.S. Cl. ...................................... 428/434; 204/30; 204/37 R; 204/38 B; 204/40; 427/168; 428/630; 428/673; 126/901
[58] Field of Search ...................... 204/30, 32 R, 38 B, 204/37 R, 40, 43 T; 428/434, 630, 631, 673, 469, 472; 427/165, 168, 383 B, 404; 126/270, 271, 901

[56] References Cited

U.S. PATENT DOCUMENTS

| | | | |
|---|---|---|---|
| 1,977,639 | 10/1934 | Langdon | 204/19 X |
| 2,219,695 | 10/1940 | Morris et al. | 204/5 |
| 2,753,928 | 7/1956 | Gray | 204/28 |
| 2,996,406 | 8/1961 | Weinrich | 427/168 |
| 3,098,756 | 7/1963 | Haracz | 427/168 |
| 3,920,413 | 11/1975 | Lowery | 204/33 |
| 3,978,272 | 8/1976 | Donley | 428/434 |
| 3,983,266 | 9/1976 | Bahls | 427/168 |
| 4,098,956 | 7/1978 | Blickensderfer | 428/627 |
| 4,104,134 | 8/1978 | Roberts | 204/37 R |

FOREIGN PATENT DOCUMENTS 44-8011  4/1969  Japan ...................... 428/434

OTHER PUBLICATIONS

Metal Finishing Guidebook & Directory 1975; Metals and Plastics Publications, Inc., Hackensack, N.J., p. 272.

*Primary Examiner*—John H. Mack
*Assistant Examiner*—William Leader
*Attorney, Agent, or Firm*—John L. Haller

[57] ABSTRACT

An improved selective absorber on a glass substrate having high solar absorption and low infrared emission. The Selective Absorber on a glass substrate includes an electrically conducting layer of silver metal having a thickness on the order of 0.1 microns, and an absorbing layer of either black nickel or, alternatively, a layer of oxidized iron over a layer of nickel or bright nickel. The method of this invention defines the process of producing the Selective Absorber on a glass substrate by thoroughly cleaning the glass, chemically depositing a thin layer of silver metal over the clean glass surface, then electroplating an absorbing layer over the silver layer. The absorbing layer may be electroplated black nickel or, alternatively, an electroplated layer of nickel or bright nickel, such as cobalt-nickel, and an electroplated cover layer of iron. The glass substate and composite layers are heat treated to thermally cured to improve its optical and properties.

10 Claims, No Drawings

SELECTIVE ABSORBER ON GLASS AND METHOD FOR ITS PRODUCTION

BACKGROUND OF THE INVENTION

1. Field of the Invention

This invention relates to a method of making a Selective Absorber which is applied to a glass substrate. The Selective Absorber has a high absorption coefficient for solar energy incident on the absorber, often referred to as solar absorptance, and a low emission coefficient for infrared radiation which corresponds to the operating temperature of the absorber, often referred to as infrared emittance. The Improved Selective Absorber disclosed herein would have particular application in the field of solar energy collecting systems of the type having an outer glass housing which holds a vacuum and an inner glass tube for transporting a heatable fluid therethrough. The Selective Absorber being suited for application to the outer surface of the inner tube.

2. Description of the Prior Art

A number of selective absorbing surfaces have been developed which offer a variety of coefficients of absorptance and coefficients of emittance over a wide spectrum of incident radiation. Even though a number of selective absorbing surfaces have been developed, Selective Absorbers applied to glass have generally been expensive and limited in tube length since these have been obtained principally by vacuum deposition. Prior to the method of this invention an inexpensive Selective Absorber on a glass substrate of arbitrary length was simply not available.

SUMMARY OF THE INVENTION

This invention relates to an Improved Selective Absorber which is applied to a glass substrate wherein the Selective Absorber has high solar absorptance and low infrared emittance, and is durable at high temperatures and temperature cycling in a vacuum.

The Improved Selective Absorber on a glass substrate comprises a silver conducting layer havng a thickness on the order of 0.1 microns. To the silver layer an absorbent layer is electroplated thereon; the absorbent layer comprising at least one layer of a metallic compound. The composite then being appropriately heat treated or cured to improve its optical properties.

One method producing the Improved Selective Absorber is to chemically deposit a smooth thin silver layer to one surface of the glass substrate through a conventional chemical deposition spray silvering method, next a layer of black nickel may be applied by submerging the silver glass into an electroplating solution then applying an electrical potential between the silvered surface and a submerged anode. The composite structure is then heat treated or cured by heating it in a vacuum.

Alternatively, a nickel or bright nickel, such as cobalt-nickel, may be electroplated onto the silver surface, then electroplating a layer of iron over the nickel or bright nickel layer. After the iron is electroplated, the entire composite piece is baked in air at a temperature between 200° C. and 400° C. for a period of time on the order of 10 to 30 minutes wherein the iron oxidizes to form a dark blue or brown appearance.

Accordingly, it is an object of the method and apparatus of this invention to provide an Improved Selective Absorber which adheres to a glass substrate. It is also an object of this invention to provide an Improved Selective Absorber on a glass substrate which is inexpensive to produce, which is not limited in length, and which demonstrates durability at high temperatures in a vacuum. It is a further object of this invention to provide an Improved Selective Absorber which is suited for operation in conventional solar energy collecting systems. A further basic object of this invention is to provide a method of making a Selective Absorber which is applied to a glass substrate by electroplating a durable absorbing surface to a chemically deposited silver layer.

DESCRIPTION OF THE PREFERRED EMBODIMENT

This invention relates to a method for making a Selective Absorber on a glass substrate whereby the Selective Absorber has high absorption for radiation in the solar spectrum and low emission for radiation in the infrared spectrum. Selective Absorbers of this type have special application for solar collectors of the type having an evacuated external glass tube and an internal tube for transporting a heatable fluid therethrough. The efficiencies of these solar collectors can be enhanced if a selective absorbing surface is applied to the outside surface of the internal tube. The prior art has been unable to satisfactorily apply an inexpensive selective absorbing surface to glass, or other insulating ceramic materials.

Accordingly, the method and apparatus of this invention, a selective absorbing surface on a glass substrate, is very beneficial to the art due to the increased efficiencies and lower cost available from the use of such a structure.

The method of this invention produces the Selective Absorber on a glass substrate by thoroughly cleaning the glass substrate, chemically depositing silver upon the clean glass substrate then electroplating a solar absorbing coating over the silver surface. The solar absorbing coating shall have at least one layer of a metallic compound and will have high absorptance for the solar spectrum and low emittance for the infrared spectrum and shall be operationally durable, meaning the effectiveness of the surface will not dissipate with time or use; namely, it will withstand, in a vacuum, temperature extremes of up to 300° C. for extended periods of time and will withstand temperature cycles between 0° C. and 300° C. every 24 hours.

The cleaning procedure may be accomplished by a sequence of cleaning and sensitizing baths or rinses, including:

1. Degreasing the glass substrate with an alconox bath, then
2. A water rinse, then
3. Exposing the glass substrate to a concentrated nitric acid bath, then
4. A water rinse, then
5. Exposing the glass substrate to a concentrated potassium hydroxide bath, then
6. A water rinse, then
7. Submerging the glass substrate in a very dilute stannous chloride solution, and finally
8. A water rinse.

To preserve the cleaned glass substrate, it may be stored in distilled water. Depending upon the cleaniness of the glass to start with; for example, untouched new glass, various steps in the cleaning process may be omitted, such as, the alconox and concentrated potassium hydroxide baths. It is, however, very important that the glass substrate be adequately cleaned for satisfactory adhesion of the subsequent layer of silver metal.

The cleaned glass substrate is then coated with a thin layer of silver metal. While the silver layer may be applied in a variety of methods, the method considered best for cost considerations, is chemical deposition using the conventional method of exposing the glass substrate to simultaneous sprays of a silvering solution and a reducing solution whereby a chemical reduction reaction deposits silver metal directly thereon. For demonstration purposes only, the silvering solution may comprise three ounces (3 ozs.) silver nitrate and two to two and a half ounces (2–2½ozs.) ammonia per gallon of water and the reducing solution may comprise two ounces (2 ozs.) glyoxal and one gallon of water. In the spray method, the ratio of reducing to silvering solutions which is sprayed over the glass substrate is about one to one. The deposited layer of silver metal should be smooth and have a thickness sufficient to be highly reflecting, but thin enough to maintain cost. An appropriate thickness for these considerations is of the order of 0.1 microns.

While other metals such as gold, copper, aluminum, or nickel, may be used as alternatives to the silver layer, insofar as they are equally satisfactory as the electrical cathode in the subsequent electroplating step, silver is preferred because it is relatively inexpensive to apply, it adheres to a glass substrate, it is durable at operating temperatures of the solar collector (ambient to 300° C.), it withstands the repetitive temperature cycling of the solar collector and, importantly, it has an inherent low infrared emittance which is a required property of the Selective Absorber.

After the silver layer is applied, an absorbing layer is electroplated thereon. The absorbing layer may be comprised of a plurality of sublayers, but must have a relatively high solar absorptance, such that the Selective Absorber so formed has a solar absorptance above 0.70 for solar radiation, and a relatively low infrared emittance such that the infrared emittance of the Selective Absorber so formed lies below 0.20. The absorbing layer must be durable such that it does not dissipate readily within an evacuated environment at operating temperatures around 300° C. and the thickness of the absorbing layer should be on the order of the wave length of visible light, 0.5 microns, or thinner.

The process of electroplating the absorbing layer to the silver layer is used because of the versatility of materials which may be plated, the relatively low cost of the procedure, the uniformity of the plated surface, and the strong adhesion to the silver layer, whereby a durable Selective Absorber is produced.

One example of such an electroplated absorbing layer is black nickel which is deposited over the silver layer to produce one embodiment of the Selective Absorber. The step of electroplating the black nickel onto the silver layer is accomplished by first preparing a black nickel plating solution comprising the following compounds in the following proportions:

1. Nickel sulphate, about 75 gm/liter $H_2O$
2. Nickel ammonia sulphate, about 45 gm./liter $H_2O$
3. Zinc sulphate, about 37.5 gm./liter $H_2O$
4. Sodium thiocyanate, about 15 gm./liter $H_2O$ The solution is then brought to a temperature of about 27° C. The glass substrate having the silver layer is then submerged into the solution and an electrical potential is applied between the silvered surface and a submerged anode such that a current density of about 2 milliamps per square centimeter ($ma/cm^2$) of electroplating surfaces achieved. The electroplating process continues for about 94 seconds to produce a coating thickness on the order of 0.1 microns or below.

The above plating solutions and procedures are presented for demonstration purposes only and are not intended to limit the essence of this invention in any way. Specifically, equivalent black nickel plating solutions or black nickel plating solutions having varying compound proportions, and which produce the desired absorbing layer are within the essence of this invention. Further, combinations of plating temperatures between 20° and 53° C., current densities between 0.6 and 7 milliamps per square centimeter, plating duration between 25 and 120 seconds, plating solution concentration of one-half (½) and three-quarter (¾) strength, and ten percent (10%) to twenty five percent (25%) variation in compound proportions of the plating solutions have been used with satisfactory results. Accordingly, the disclosed variations are representative of the invention only and are not to be construed as a limitation thereof.

The completed glass substrate and composite silver and black nickel layer is cured by heating it in a vacuum of about 20 microns, produced by either a mechanical pump or a diffusion pump, to a temperature of about 460° C. for about four (4) hours. The curing temperature may vary between 200° to 600° C. and the curing time may vary between 2 hours to 24 hours. The curing time and temperature are varied to produce the desired optical properties and durability characteristics, specifically, increased absorptance and a reduction in emittance is achieved by further darkening of the surface of the absorbing layer. Curing or heat treating at too high a temperature or too long a duration will cause the ultimate lightening of the surface and eventual reduction of optical properties.

The resulting Selective Absorber on a glass substrate exhibits an absorptance of approximately 0.85 for a mass 2 solar spectrum and an emittance of approximately 0.04 at 100° C.

In this configuration, the resulting Selective Absorber on a glass substrate is particularly suited for operation on the outside surface of an internal tube for transporting a heatable fluid which is within an evacuated glass chamber of a conventional solar collecting system. In such an environment, the Selective Absorber absorbing surface readily withstands the extreme operating temperatures and repetitive temperature cycling of such solar collector systems, and provides a substantial increase in efficiencies of such collectors.

Although the black nickel over silver on the glass substrate produces an excellent Selective Absorber, other alternatives are satisfactory and are readily applied. The versatility available to the selection of an absorbing surface is a result of the properties of the thin silver layer which has a relatively strong adhesion to the glass substrate and to which a wide variety of absorbing layers may be applied.

Another example of an electroplated absorbing surface which provides the proper durability with high solar absorptance and low infrared emittance is an electroplated layer of nickel or bright nickel, such as cobalt nickel, over the silver layer, then an electroplated layer of iron over the nickel or bright nickel, which is then heated in air to oxidize the iron to form a darkened surface.

The cobalt nickel layer may be applied by preparing a cobalt nickel plating solution comprising the following substances in the following portions:
1. Cobalt sulphate, about 15 gm/liters $H_2O$
2. Nickel sulphate, about 150 gm/liters $H_2O$
3. Nickel chloride, about 25 gm/liters $H_2O$ After the cobalt nickel plating solution is heated to between 20° and 53° C., the silvered glass substrate is submerged therein and an electrical potential is applied between the silvered surface and submerged anode. The electrical potential should be sufficient to provide a current density of between 0.6 and 7 milliamps per square centimeter of plating surface. The cobalt nickel electroplating process is allowed to continue for a time sufficient to produce a cobalt nickel layer having a thickness of about 0.02 to 0.5 microns.

A satisfactory alternative to the cobalt nickel layer would be a nickel layer electroplated over the silvered glass substrate in a similar process. The nickel plating solution would include the following compositions in the following proportions:
1. Nickel sulphate, about 50 gm./liter $H_2O$
2. Nickel chloride, about 13 gm./Liter $H_2O$
3. Boric acid, about 8 gm./liter $H_2O$ Over either the nickel or the nickel cobalt layer, a layer of iron is applied by a similar electroplating process. The electroplating iron solution comprises the following compounds in the following ratio:
1. Ferrous chloride, about 300 gm./liters $H_2O$
2. Calcium chloride, about 335 gm./liters $H_2O$ After the iron plating solution is heated to between 20° and 53° C., the nickel or cobalt nickel plated surface is submerged therein where an electrical potential is applied between the nickel or cobalt nickel surface and a submerged anode such that a current density of between 0.6 and 7 milliamps per square centimeter of surface is achieved. The plating continues until the iron layer develops a thickness of between 0.02 and 0.5 microns.

After the iron is plated over the nickel or cobalt nickel layer, the glass substrate and composite silver, nickel, or cobalt nickel, and iron layer is heated in air at approximately one atmosphere, to a temperature between about 200° and 400° C. for 10 to 30 minutes to oxidize the iron whereby to form a dark brown or blue absorbing surface. The duration of the heating depends on the temperature and can vary from a few minutes to a few hours.

Other absorbing surfaces should prove to be equally satisfactory. For example, one embodiment of a Selective Absorber on a glass substrate having an absorbing surface which is durable is an absorbing surface of nickel oxide that is acquired by electroplating nickel onto the silvered surface and then properly heat treated or temperature cured in air.

Many electroplating coatings have been attempted, however, because of insufficient durability, low absorption coefficients, or because they remove the silver layer from the glass substrate, they have proven wholly unsatisfactory. These unsatisfactory coatings include black chrome, or copper oxidized on silver or nickel.

The apparatus of this process, the Selective Absorber on a glass substate, includes a layer of silver over the glass substrate having a thickness of between 0.02 and 0.5 microns, a layer of black nickel over the silvered layer, having a thickness of between 0.02 and 0.5 microns which has been cured by heating it in a vacuum at a temperature which can vary from 200° to 600° C. for a period of time from about an hour to on the order of 24 hours. Alternatively, a layer of nickel or cobalt nickel may be applied over the silver layer wherein the layer of nickel or cobalt nickel has a thickness of about 0.02 to 0.5 microns and a layer of oxidized iron supplied over the layer of nickel or cobalt nickel. Each of these improved solar collectors are particularly suited for operation in an evacuated chamber at temperatures of up to 300° C. and for temperature cycling over an extended period of time. Satisfactory absorptance in the visible solar spectrum of above 0.70 and an emittance in the infrared spectrum below 0.2 is preferred.

The table below, shows examples of absorption coefficients for two representative embodiments discussed above, and also for the average emission coefficients for these embodiments over a range of temperatures. The table also shows acceptable limits for a theoretical sample. The average absorption coefficient would lie below the values measured in the visible because approximately one fourth the solar energy is high on the solar spectrum where the absorption is dropping rapidly.

TABLE I

| | Average Absorption and Emission Coefficients | | | | |
|---|---|---|---|---|---|
| | Absorp- | Emission | | | |
| Sample | tion | 20° C. | 100° C. | 200° C. | 300° C. |
| Black Nickel | 0.84 | 0.04 | 0.04 | 0.05 | 0.06 |
| Iron on Cobalt-nickel | .75 | 0.04 | 0.04 | 0.05 | 0.06 |
| Theoretical sample | .70 | — | — | — | 0.20 |

The properties of the Improved Selective Absorber on a glass substrate which have been described herein are particularly well suited for application with the type solar collector described above. The method of this invention therefore produces a Selective Absorber on a glass substrate which is heretofore unavailable at low cost for such applications. Accordingly, the industry is significantly advanced by the method and device of this invention.

It is understood that this description of my invention is done to fully comply with requirements of 35 U.S. C. §112 and is not intended to limit my invention in any way. It is seen from the above description that varying forms of the Improved Selective Absorber and method for making the Selective Absorber could easily be developed within the skill of the art, therefore, such varying forms are considered to be within the scope and essence of my invention.

What is claimed is:

1. A method for producing a composite layer on a glass substrate for selectively absorbing solar radiation, the composite layer and glass substrate having a coefficient of solar absorption greater than 0.70 and an infrared emittance less than 0.20, comprising the steps of:
   (a) cleaning the glass substrate;
   (b) chemically depositing a layer of silver metal on the glass substrate by exposing the glass substrate to simultaneous sprays of a silvering solution and a reducing solution until said layer of silver metal achieves a thickness on the order of 0.10 microns;
   (c) electroplating a layer of black nickel over the layer of silver by preparing a black nickel plating solution, bringing the plating solution to a temperature of between 20 and 53 degrees centigrade, submerging the glass substrate with the layer of chemically deposited silver into the plating solution, and applying electrical potential between the layer of deposited silver and an anode submerged in the black nickel plating solution until the layer of black nickel has achieved a thickness of between 0.02 and 0.5 microns; and (d) heat treating said glass substrate and composite layer of silver and black nickel in a vacuum of about 20 microns or less and a temperature of about 200 to 600 degrees centigrade for about 2 to 24 hours.

2. The method of claim 1 wherein said black nickel plating solution comprises:
about 75 gm./liter $H_2O$ of nickel sulphate;
about 45 gm./liter $H_2O$ of nickel ammonium sulphate;
about 37.5 gm./liter $H_2O$ of zinc sulphate; and
about 15 gm./liter $H_2O$ of sodium thiocyanate.

3. The method of claim 1 wherein said electrical potential provides a current density of between 0.6 to 7.0 milliamps per square centimeter of electroplating surface area.

4. A method for producing a composite layer on a glass substrate for selectively absorbing solar radiation, the composite layer and glass substrate having a coefficient of solar absorption greater than 0.70 and an infrared emittance less than 0.20, comprising the steps of:
(a) cleaning the glass substrate;
(b) chemically depositing a layer of silver metal on the glass substrate by exposing the glass substrate to simultaneous sprays of a silvering solution and a reducing solution until said layer of silver metal achieves a thickness on the order of 0.10 microns;
(c) electroplating a layer of cobalt nickel over the layer of silver by preparing a cobalt nickel plating solution, bringing the cobalt nickel plating solution to a temperature of between 20 and 53 degrees centigrade, submerging the glass substrate with the layer of chemically deposited silver into the cobalt nickel plating solution, and applying electrical potential between the layer of deposited silver and an anode submerged in the cobalt nickel plating solution until the layer of cobalt nickel has achieved a thickness of between 0.02 and 0.5 microns,
(d) electroplating a layer of iron over the layer of cobalt nickel by preparing an iron plating solution, bringing the iron plating solution to a temperature between 20 and 53 degrees centigrade, submerging the glass substrate with the deposited layer of silver and electroplated layer of cobalt nickel into the iron plating solution and applying an electrical potential between the layer of plated cobalt nickel and an anode submerged in the iron plating solution until the layer of iron has achieved a thickness of between 0.20 and 0.5 microns; and
(e) heat treating the glass substrate and composite silver, cobalt nickel and iron layers in air at about one atmosphere and a temperature of about 200 to 400 degrees centigrade for about 10 minutes to 24 hours.

5. The method of claim 4 wherein said cobalt nickel plating solution comprises:
about 15 gm/liter $H_2O$ of cobalt sulphate;
about 150 gm/liter $H_2O$ of nickel sulphate; and
about 25 gm/liter $H_2O$ of nickel chloride
and wherein the iron plating solution comprises:
about 300 gm/liter $H_2O$ of ferrous chloride; and
about 335 gm/liter $H_2O$ of calcium chloride.

6. A method for producing a composite layer on a glass substrate for selectively absorbing solar radiation, the composite layer and glass substrate having a coefficient of solar absorption greater than 0.70 and an infrared emittance less than 0.20, comprising the steps of:
(a) cleaning the glass substrate;
(b) chemically depositing a layer of silver metal on the glass substrate by exposing the glass substrate to simultaneous sprays of a silvering solution and a reducing solution until said layer of silver metal achieves a thickness on the order of 0.10 microns;
(c) electroplating a layer of nickel over the layer of silver by preparing a nickel plating solution bringing the nickel plating solution to a temperature of between 20 and 53 degrees centigrade, submerging the glass substrate with the layer of chemically deposited silver into the nickel plating solution, and applying electrical potential between the layer of deposited silver and an anode submerged in the nickel plating solution until the layer of nickel has achieved a thickness of between 0.02 and 0.5 microns;
(d) electroplating a layer of iron over the layer of nickel by preparing an iron plating solution, bringing the iron plating solution of between 20 and 53 degrees centigrade, submerging the glass substrate with the desposited layer of silver and electroplated layer of nickel into the iron plating solution and applying electrical potential between the layer of plated nickel and an anode submerged in the iron plating solution until the layer of iron has achieved a thickness of between 0.02 and 0.5 microns; and
(e) heat treating the glass substrate and composite silver, nickel and iron layers in air at about one atmosphere and a temperature of about 200 to 400 degrees centigrade for about 10 minutes to 24 hours.

7. The method of claim 6 wherein said nickel plating solution comprises:
about 50 gm/liter $H_2O$ of nickel sulphate;
about 13 gm/liter of nickel chloride; and
about 18 gm/liter of boric acid;
and wherein the iron plating solution comprises:
about 300 gm/liter $H_2O$; and
about 335 gm/liter $H_2O$ of calcium chloride.

8. The device produced according to the process of claim 1.

9. The device produced according to the process of claim 4.

10. The device produced according to the process of claim 6.

UNITED STATES PATENT AND TRADEMARK OFFICE
CERTIFICATE OF CORRECTION

PATENT NO. : 4,228,220

DATED : October 14, 1980

INVENTOR(S) : John D. Garrison

It is certified that error appears in the above—identified patent and that said Letters Patent is hereby corrected as shown below:

In the abstract, line 17, "to" first occurrence should read -- or --.

In the abstract, line 18, delete "and".

Column 8, line 33, after "solution" add -- to a temperature --.

Column 8, line 37, after "applying" add -- an --.

Column 8, line 49, after "liter" add -- $H_2O$ --.

Column 8, line 50, "18" should read -- 8 --.

Column 8, line 50, after "liter" add -- $H_2O$ --.

Signed and Sealed this

Nineteenth Day of May 1981

[SEAL]

Attest:

RENE D. TEGTMEYER

Attesting Officer     Acting Commissioner of Patents and Trademarks